R. W. GODFREY.
AUTOMATIC TALKING MACHINE.
APPLICATION FILED FEB. 12, 1917.

1,399,110.

Patented Dec. 6, 1921.
9 SHEETS—SHEET 1.

WITNESSES

INVENTOR
Raleigh W. Godfrey.

R. W. GODFREY.
AUTOMATIC TALKING MACHINE.
APPLICATION FILED FEB. 12, 1917.

1,399,110.

Patented Dec. 6, 1921.
9 SHEETS—SHEET 4.

WITNESSES

INVENTOR
Raleigh W. Godfrey

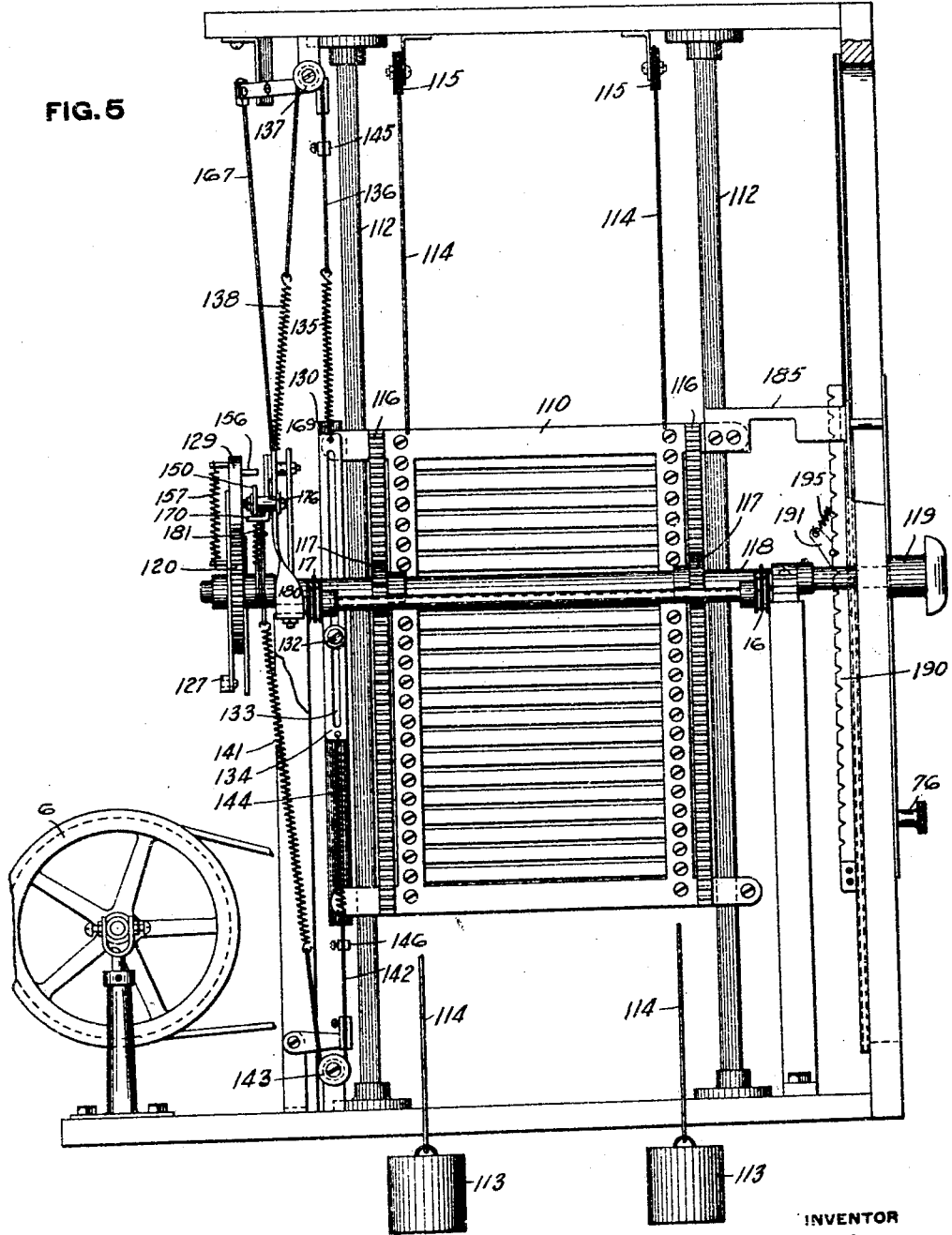

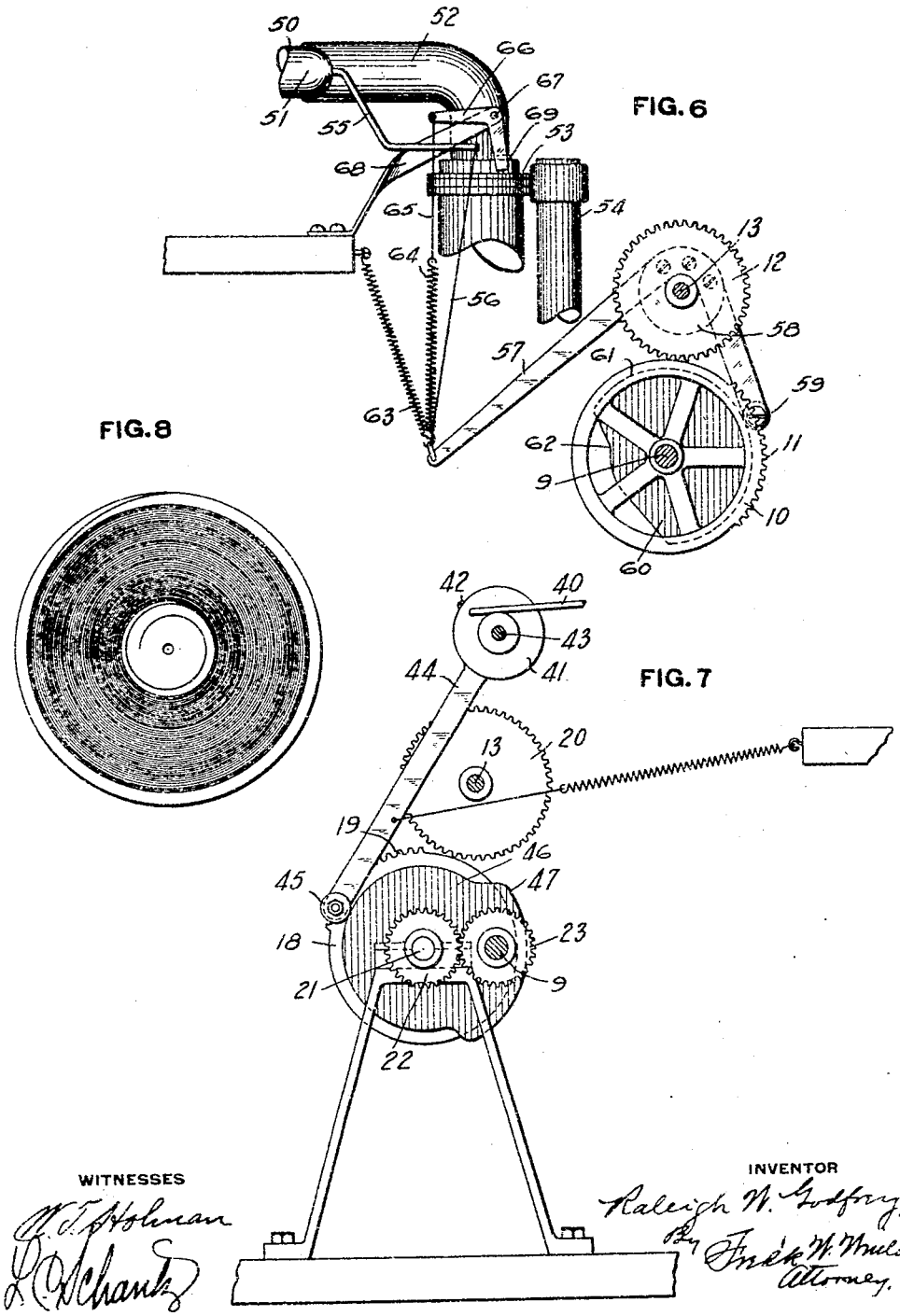

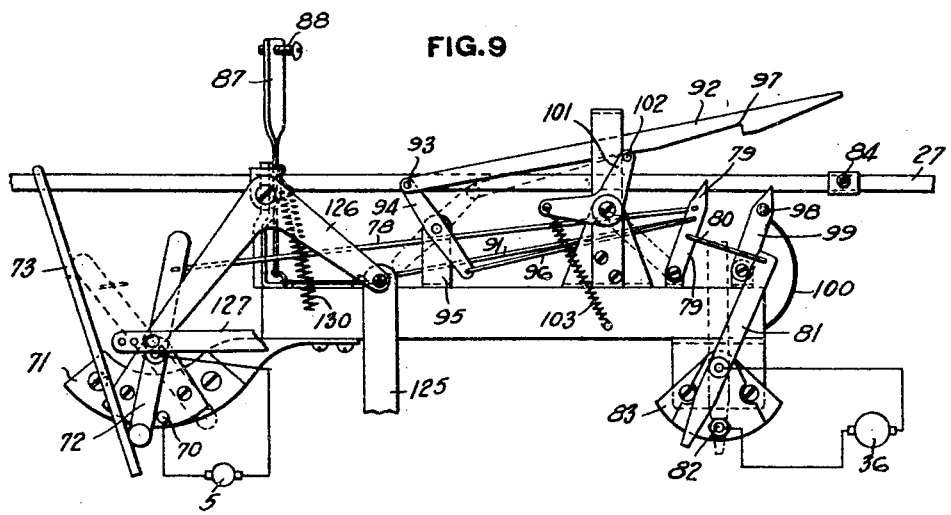
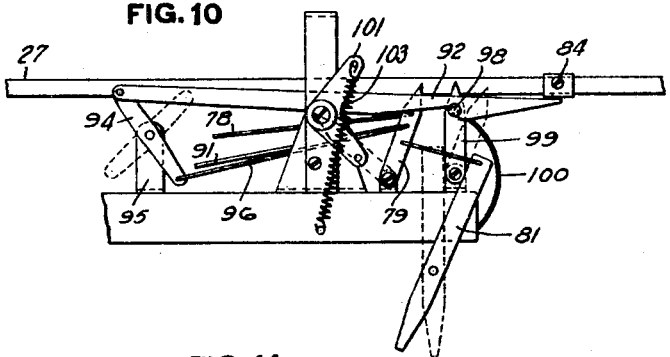
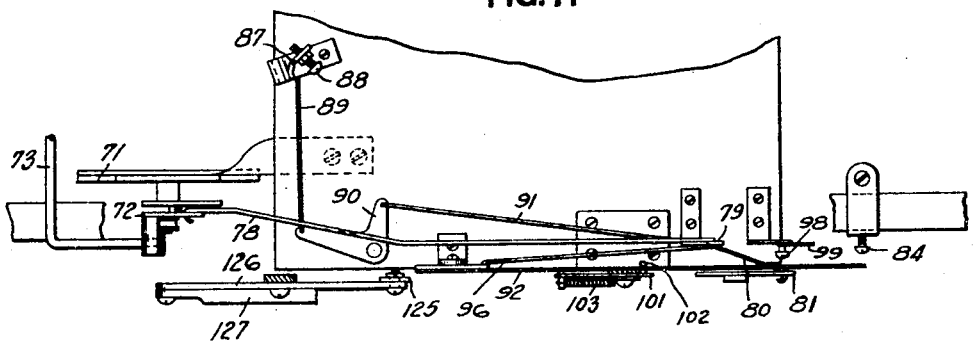

R. W. GODFREY.
AUTOMATIC TALKING MACHINE.
APPLICATION FILED FEB. 12, 1917.

1,399,110.

Patented Dec. 6, 1921.
9 SHEETS—SHEET 8.

WITNESSES

INVENTOR

R. W. GODFREY.
AUTOMATIC TALKING MACHINE.
APPLICATION FILED FEB. 12, 1917.

1,399,110.

Patented Dec. 6, 1921.
9 SHEETS—SHEET 9.

UNITED STATES PATENT OFFICE.

RALEIGH W. GODFREY, OF OBERLIN, OHIO, ASSIGNOR OF THREE-FOURTHS TO STANTON S. HOBBS, OBERLIN, OHIO.

AUTOMATIC TALKING-MACHINE.

1,399,110.  Specification of Letters Patent.  Patented Dec. 6, 1921.

Application filed February 12, 1917. Serial No. 148,050.

*To all whom it may concern:*

Be it known that I, RALEIGH W. GODFREY, a resident of Oberlin, in the county of Lorain and State of Ohio, have invented a new and useful Improvement in Automatic Talking-Machines, of which the following is a specification.

The invention relates to automatic sound reproducing machines. More particularly it relates to a machine for automatically playing musical or other records of phonographs, graphophones, victrolas and the like.

One of the objects of the invention is to provide an improved machine which will automatically play any one or more of a plurality of sound reproducing records.

Another object is to provide an improved machine which will automatically select a record, convey it to the sound reproducing machine, play the record, and automatically return it to the record holding rack.

A further object is to provide a machine which will automatically and successively play a number of sound reproducing records.

Other objects and advantages of the invention will hereinafter appear.

The accompanying drawings illustrate an embodiment of the invention. The views of said drawings are as follows:

Fig. 5 is a front elevation of the machine.

Fig. 6 is a view on the line 6—6 of Fig. 2, showing the mechanism for raising the arm carrying the needle that bears on the record and automatically moving it after the record is played to a position ready for playing the next record.

Fig. 7 is a view on the line 7—7 of Fig. 2, looking in the direction of the arrows, and showing the mechanism for automatically centering the record after it has been placed in position to be played.

Fig. 8 is a plan view of a record for use in the machine.

Fig. 9 is a side elevation of the mechanism for automatically starting and stopping the record carrier and the record player.

Fig. 10 is a partial side elevation of the mechanism shown in Fig. 9, illustrating it in position for successively playing a plurality of records.

Fig. 11 is a top plan view of the mechanism shown in Figs. 9 and 10.

The machine comprises, generally speaking, a record playing mechanism 1, a record rack 2 for the records to be played, a record carrier 3 for automatically taking the records from the rack and depositing them on the playing means and returning them after they are played to the record rack. The machine is arranged so that the operator may, by moving a handle, select the record to be played and then by operating a lever, start the machine, which thereupon selects the record from the record rack and deposits it on the record playing means where it is automatically centered. As the record carrier deposits the record on the record playing means it automatically starts the record playing means and is itself stopped. After the record has been played the record playing means is automatically stopped and the record carrier automatically operated to take the record from the playing means and deposit it in the rack. At the same time the arm of the record player is automatically moved to proper position for playing the next record. The machine is also arranged so that it may be adjusted to continuously play a number of records, that is, as soon as one record has been deposited on the rack the machine automatically selects a second record and plays it, and after that one has been played, a third record, and so on.

Figure 1:
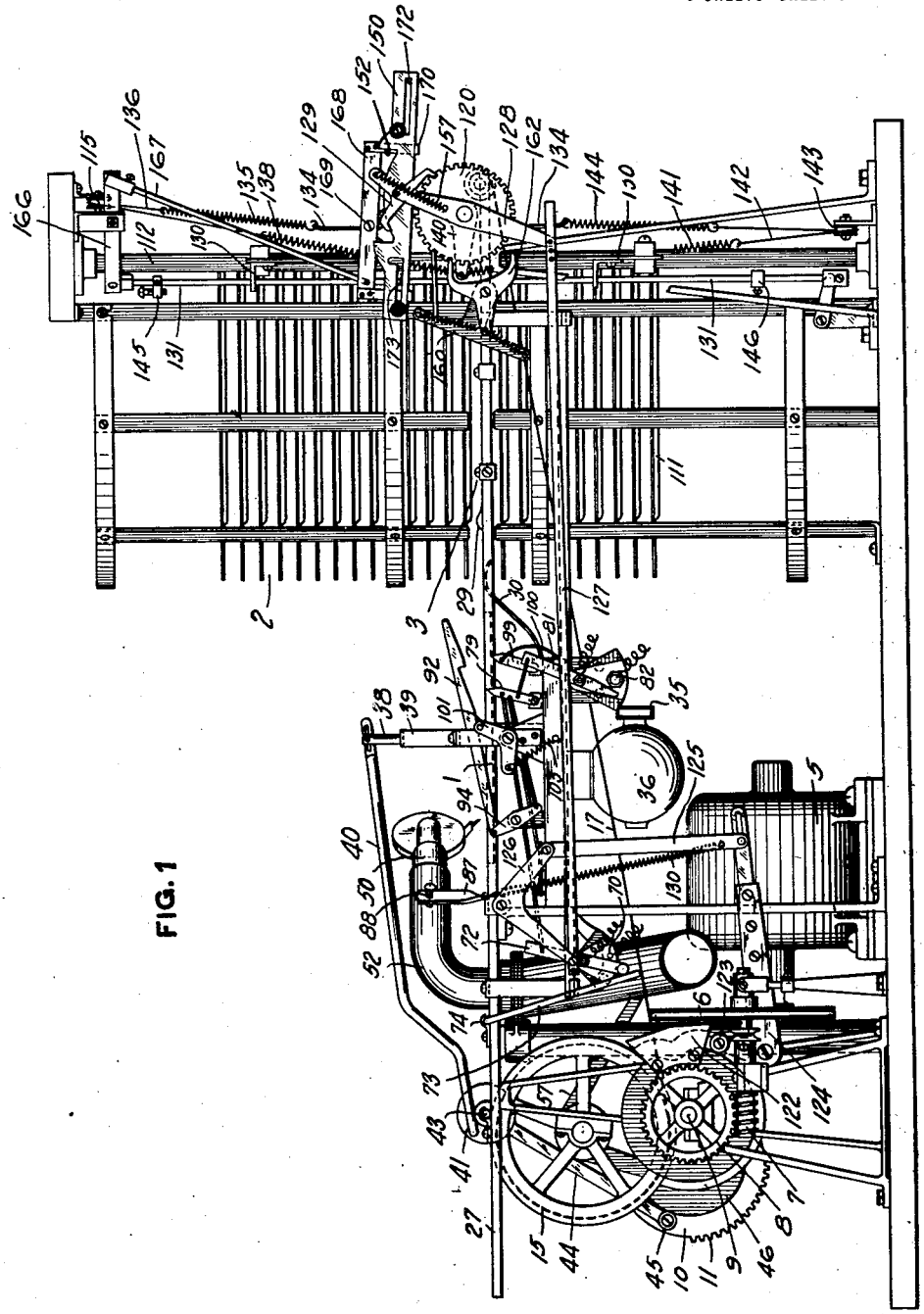
Figure 1 is a side elevation of the machine.
Figure 2:
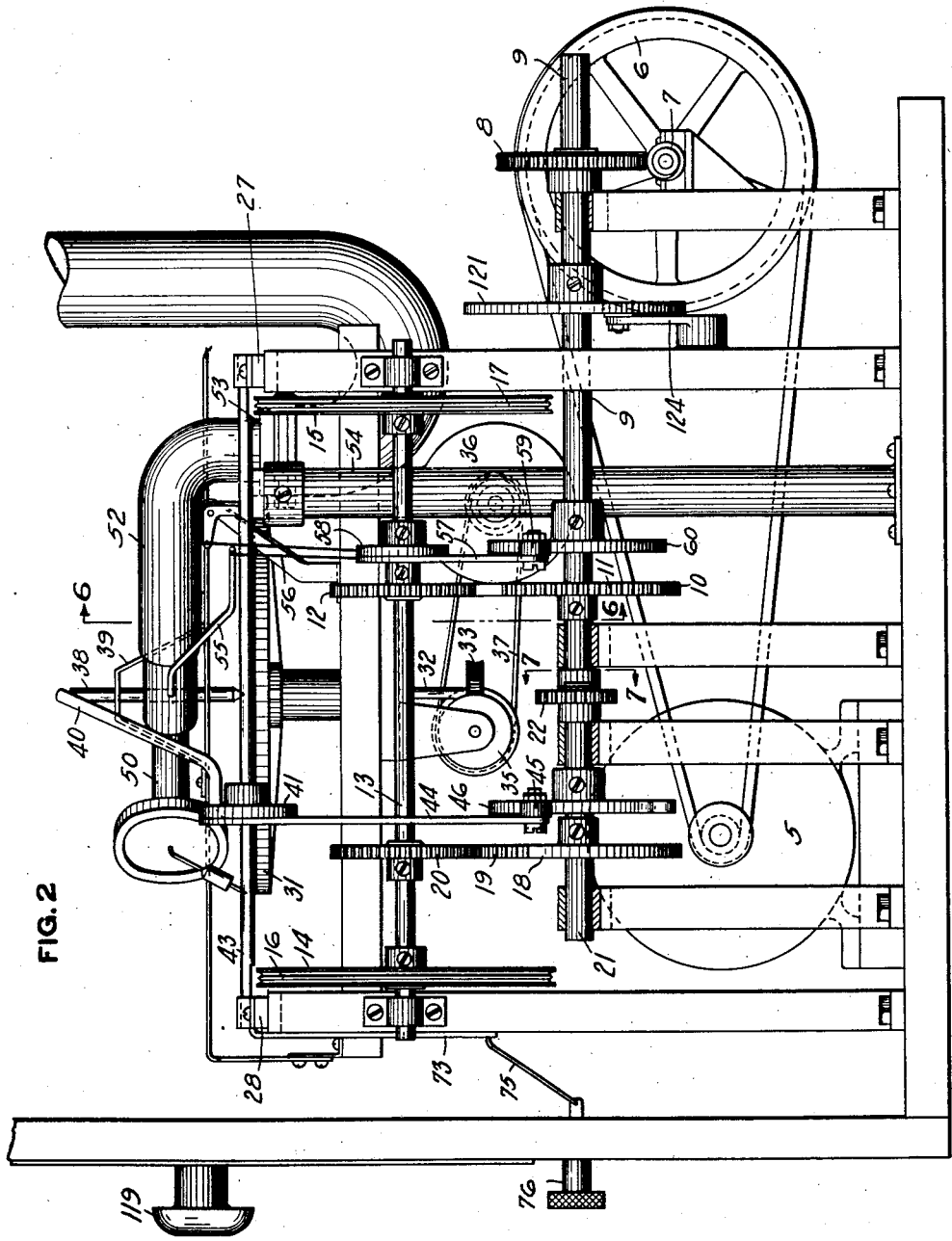
Fig. 2 is a rear elevation thereof.

The record carrying mechanism is driven by a motor 5, preferably an electric motor, which drives by means of a chain or belt, a wheel 6, as shown in Figs. 1 and 2. This wheel is fixed to a shaft which has a worm 7 on the opposite end thereof meshing with a worm wheel 8 carried by a shaft 9 which may be termed the driving shaft of the machine. Fixed to the shaft 9 is a gear 10 having teeth 11 on a portion of its periphery, the remainder of the gear being blank. This intermittent gear 10 meshes with a gear 12 carried by a shaft 13 extending the full width of the machine and having fixed to opposite ends thereof the driving pulleys 14 and 15 which have grooved peripheries in which cords or ropes 16 and 17, shown in Fig. 3, travel. These cords are fixed to the drive pulleys and also attached to the record carrier so that when the pulleys are operated in one direction the record carriers move forward and when they are rotated in the opposite direction the carrier is moved in the opposite direction.

The record carrier driving pulleys 14 and 15 are driven in one direction by the intermittent gear 10. When the shaft 9 is rotated the teeth 11 on the gear 10 mesh with the teeth of the gear 12 and rotate the drive pulleys in a direction to move the record carrier to return a record from the playing table to the record rack. This rotation of the drive pulleys and actuation of the record carrier occurs during only a portion of the rotation of the shaft 9, since during the remainder of the revolution of the shaft the blank face of the gear 10 is opposite the gear 12.

The record carrier drive wheels are rotated in the opposite direction by means of a second intermittent gear 18 having teeth 19 on a portion of the periphery thereof which coöperate with the gear 20 also carried by the shaft 13 to which the drive pulleys 14 and 15 are fixed. The intermittent gear 18 is fixed to a jack shaft 21 which carries a gear 22 that meshes with a similar gear 23 carried by the main drive shaft 9. Consequently as the main drive shaft is rotated the intermittent gear 10 is rotated in one direction and the intermittent gear 18 is rotated in the opposite direction. Both of these gears mesh with gears carried by the shaft 13 to which the record carrier drive wheels 14 and 15 are fixed. Accordingly when the main shaft 8 is rotated the record carrier drive wheels will first be rotated a certain distance in one direction and subsequently be rotated a corresponding distance in the opposite direction. The record carrier is thus moved to place a record on the playing means and then moved to return the record to the record rack.

Figure 3:
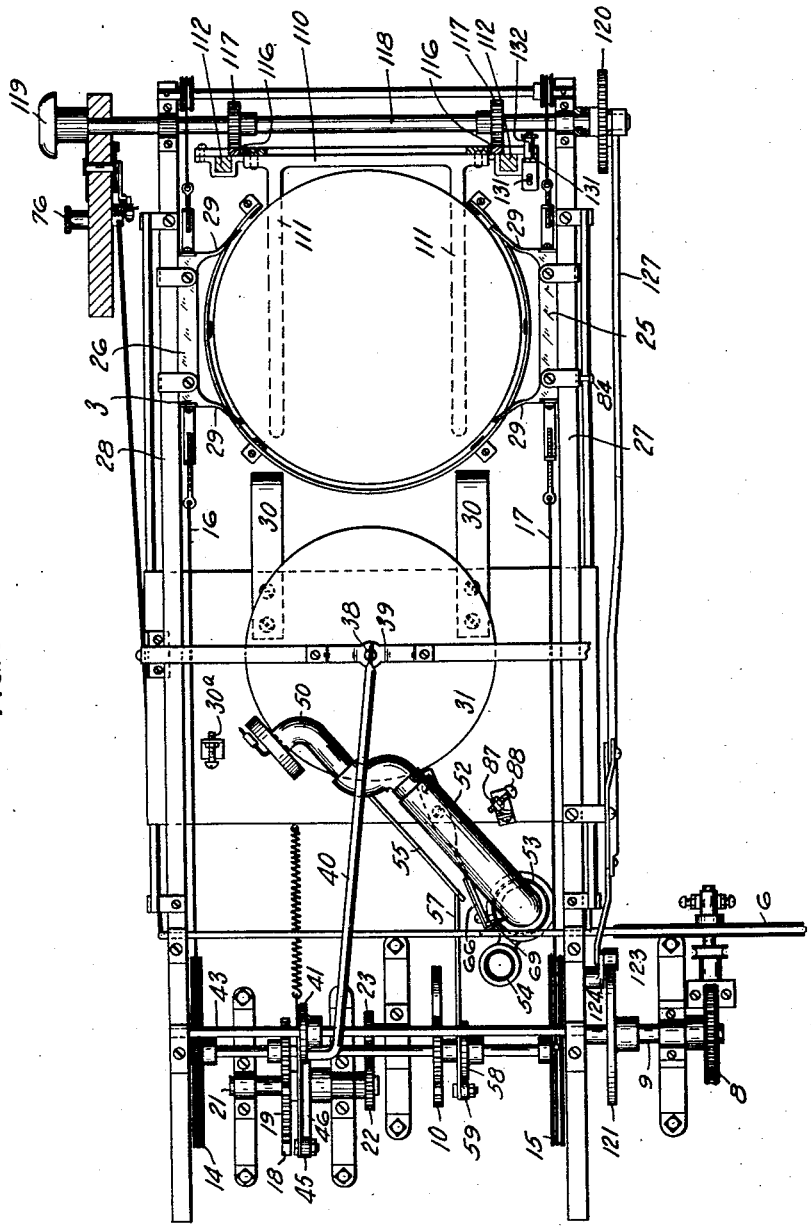
Fig. 3 is a plan view.

The record carrier comprises two slidably mounted members 25 and 26, shown in Fig. 3, which are arranged to slide on the bars 27 and 28, which in this case form a portion of the frame of the machine. The members 25 and 26 carry arms 29 which are shaped and spaced so that they serve as a means for gripping the edge of a record for sliding it to and from the record player. The slidable members 25 and 26 are connected to the flexible driving cords 16 and 17 which pass around pulleys at the rear of the machine and are fixed to the driving pulleys 14 and 15. Accordingly whenever the driving pulleys are rotated the cords move the sliding members 25 and 26 and any record which is between the arms 29 of these members is moved with the carrier. The arrangement is such that the carrier slides the record from the record rack onto yielding guides 30 to the record playing means 3. In order to prevent overtravel of the carrier a suitable stop 30ª is provided for engaging the carrier when the record reaches the proper position on the playing table.

It will thus be seen that when the driving pulleys 14 and 15 are rotated the record carrier is moved therewith in a direction depending upon the direction of rotation of the drive wheels. These drive wheels are first rotated by one of the intermittent gears in one direction as the main drive shaft 9 rotates. The machine is timed so that the main shaft is actuated only for such a period as is necessary for causing one of the intermittent gears to move the carrier from one of its positions to the other. Upon the next actuation of the main shaft the other intermittent gear rotates the record carrier drive wheels 14 and 15 in the opposite direction and moves the record carrier back to its first position, during which time the blank portion of the first intermittent gear is moved part of the teeth of the gear with which it coöperates and the teeth on the intermittent gear are moved around to a position where they are ready to actuate the record carrier upon the third actuation of the drive shaft.

The record playing means 3 comprises a rotating table 31 carried by shaft 32 to which is fixed a worm gear 33 driven by a worm 34 on a shaft carrying a pulley 35 driven by a motor 36 by means of a chain or belt 37. The motor 36, which is preferably an electric motor, operates independently of the main motor 5, its circuit connections being controlled by the movement of the record carrier and by the arm which carries the record needle so that when the carrier moves the record to the playing table the motor 36 is automatically started and after the record is played the motor is automatically stopped.

Figure 4:
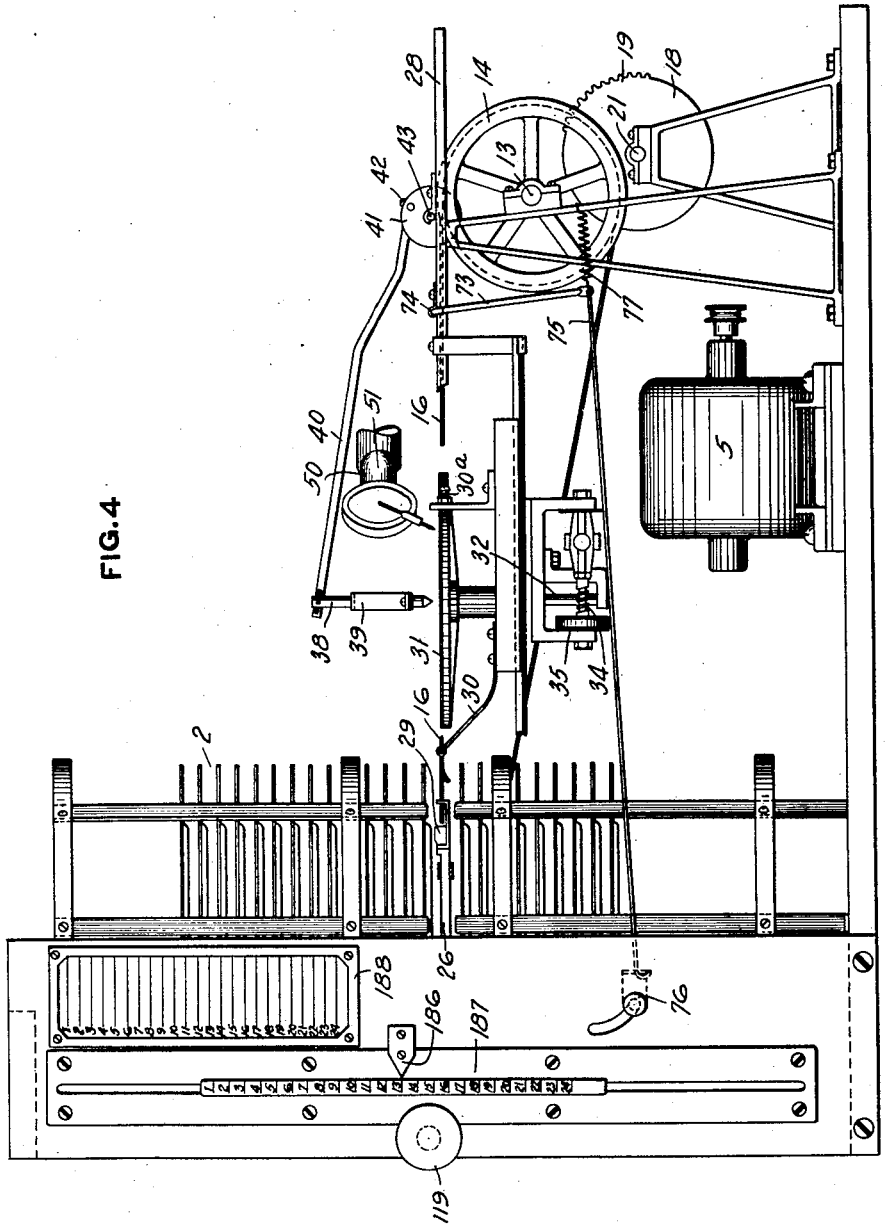
Fig. 4 is a side elevation of the side of the machine opposite to that shown in Fig. 1.

When the record is transferred to the rotating table 31 it is automatically centered thereon by means of a reciprocating member 38 having a conical end adapted to engage an opening in the center of the record. The member 38 slides in a fixed bearing 39 and has a pin and slot connection with an arm 40, as shown in Figs. 1 and 4. The opposite end of this arm has a right angular projection fitting in an opening in the disk 41 and held firmly therein by a set screw 42. This disk is carried by a shaft 43 journaled in the frame of the machine and integral with the disk or rigidly attached thereto is an arm 44 carrying a cam roller 45 on its free end, as shown in detail in Fig. 7. The cam roller 45 coöperates with a cam 46 which is fixed to the shaft 21 that carries intermittent gear 18. This cam is circular except for a raised portion 47 which, when it engages the cam roller 45, swings the free end of the arm 44 outwardly and moves the disk 41 with the arm 40 rigidly attached thereto, thereby swinging the outer end of arm 40 down and pushing the member 38 into engagement with the central opening in the record to center the record. The shaft 21 which carries the cam 46 for operating the record centering means also carries the intermittent gear 18 which brings the record from the rack to the revolving table and the teeth on the intermittent gear are positioned relative to the raised portion of the cam 46 so that after the teeth 19 of this gear have engaged the teeth 20 and moved the record to the table, the cam operates the centering means to center the record. The record, in being played, rotates between the arms of the carrier, there being sufficient clearance for this purpose and such clearance being properly distributed when the record is centered on the table.

After a record has been played it is necessary to raise the needle carrier and move the tone arm to a position where the needle may engage the surface of the next record near the outer periphery thereof. The arm 50 which carries the needle is pivoted at a point 51 to the main tone arm 52 which is arranged so that it may swivel in a bracket 53 carried by a fixed or stationary standard 54. The arm 50 is provided with an extension 55 to which is attached a cord or other flexible member 56 also fastened to one end of a bell crank lever 57, the latter being attached to a disk 58 loosely mounted on the shaft 13. The other end of the bell crank lever carries a cam roller 59 which coöperates with a cam 60 carried by the drive shaft 9. This cam has a raised portion 61 and a depressed portion 62. When the raised portion engages the roller 59 it moves the end of the bell crank lever to which the cord 56 is connected downwardly and thereby swings the arm 50 about the pivot 51 and lifts the needle from the record. When the depressed portion 62 comes opposite the roller 59 the bell crank lever is moved by a spring 63 to relieve tension on the cord 56, thereby permitting the arm 50 to move by gravity back to its original position with the needle in engagement with the record. It will be noted that the cam 60 is mounted on the same shaft 9 that carries the intermittent gear 10 which actuates the record carrier in a direction to move the record from the playing table to the record rack. The cam 60 is positioned relative to the intermittent gear 10 and also relative to the intermittent gear 18 so that after the record has been moved to the playing table by the actuation of the carrier by the intermittent gear 18 the depressed portion 62 is opposite the cam roller 59 which thereby permits the arm 50 to drop to position with the needle on the record. As soon as the record is played, the raised portion 61 of the cam comes opposite the roller 59 and raises the needle from the record just before the teeth 11 on the intermittent gear 10 engage the gear 12 for actuating the record carrier to return the record from the playing table to the record rack.

The tone arm 52 which carries the member 50 that supports the needle is also automatically returned after a record has been played to a position to play the next record. This automatic return is also effected through the medium of the bell crank lever 57 actuated by the cam 60. One of the arms of the bell crank lever is connected to a spring 64 and a cord 65 with a second bell crank lever 66 pivoted at 67 to a support 68 fixed to the frame of the machine. The tone arm 52 carries a projecting pin 69 which is engaged by the free end of the bell crank lever 66. As the playing of a record is completed the cam 60 moves the arm of the bell crank lever 57 to which the cord 56 and the spring 64 are attached downwardly causing the needle to be raised from the record and at the same time actuating the bell crank lever 56, the free end of which engages the pin 69 and swings the tone arm 52 to proper position for playing the next record.

From the mechnaism above described it will be clear that, when the machine is operated, a record is removed from the rack and placed on a playing table and is automatically centered in position, the needle is dropped into place and after the record is played the needle is automatically raised, the tone arm is moved back to position for playing the next record, and the record that has just been played is removed from the table and returned to the rack.

The record carrier and the record playing means are automatically switched on and off by mechanism shown more particularly in Figs. 1, 9, 10 and 11.

The circuit of the main motor 5 is connected to a contact 70 mounted on an insulating segment 71. The other side of the motor is connected so as to be in electrical contact with the switch arm 72 which is mounted so that it may be moved to engage the contact 70 and close the circuit of the motor. The switch arm 72 is moved manually to close the switch by means of a U-shaped lever 73, which is journaled at 74 on the frame of the machine. One arm of the lever engages the switch 72 and the other arm extends downwardly on the opposite side of the machine, as shown in Fig. 4, and is connected to a rod 75 which may be moved by handle 76 to actuate the switch. A spring 77 is attached to the rod 75 for normally biasing the rod, the handle 76 and the U-shaped member 73, so that the switch actuating means is automatically returned to its original position after the switch 72 has been closed.

The switch 72 is connected by means of a rod 78 to a pivoted arm 79 having a double bevel end which extends into the path of the record carrier. The arm 79 is in turn connected by a rod 80 with a second switch arm 81 which is arranged to engage a contact 82 mounted on the insulating segment 83. One side of the circuit of the motor 36 for actuating the playing mechanism is connected to the contact 82 and the other side of the motor is connected so as to be in electrical contact with the switch arm 81. Accordingly whenever the arm 81 engages contact 82 the circuit of motor 36 is completed and the playing mechanism operated.

The machine is started by moving the manual member 76, shown in Fig. 4 upwardly, which pulls the lower end of the U-shaped lever 73 into engagement with the switch 72 and moves the same sufficiently to carry it onto the contact 70 to close the circuit of the motor 5. The movement of switch arm 72 is communicated to the arm 79 and the second switch arm 81, but the latter is not moved sufficiently to close the circuit of the motor 36. The motor 5 is consequently energized and the machine started which action moves the record carrier from the record rack toward the playing mechanism to deposit the record on the playing table. As the record carrier reaches the end of its movement a pin 84 thereon engages the upper end of the arm 79 and moves the same over to substantially the dotted line position shown in Figs. 9 and 10. This movement pushes the switch arm 72 around in a contra-clockwise direction, entirely across and out of engagement with the contact 70, thereby opening the circuit of the motor 5 and stopping the motor and the record carrier. The same movement of arm 79 causes switch arm 81 to be moved into engagement with contact 82, thereby closing the circuit of the playing motor 36, which thereupon rotates the playing table to play the record. After the record has been played the motor 36 which actuates the playing mechanism is automatically stopped, as follows:—

Pivoted to the frame of the machine adjacent the playing mechanism is an arm 87, the upper end of which is positioned so that as the tone arm reaches the position it occupies when the record is played it engages a set screw 88 in the upper end of the arm and moves the upper end of the arm outwardly. The lower end of the arm 87 is connected by means of a rod 89, shown in Fig. 11 to a bell crank lever 90, the other arm of which is connected by means of a rod 91, to the arm 79. Consequently, when the upper end of the arm 87 is moved outwardly by the arm 52 the arm 79 is pushed to the right and the switch arm 81 actuated through the rod 80 to open the circuit of the motor 36. Movement of the arm 79 also moves the switch arm 72, controlling the circuit of the main motor, into engagement with the contact 70. Accordingly when the record has been played the circuit of the motor 36 is automatically opened and the circuit of the motor 5 is automatically closed. The motor 5 thereupon actuates the mechanism and the record carrier is moved to return the record to the rack. The mechanism for lifting the needle is timed so that the needle is lifted before the carrier moves the record to return it to the rack.

In order to insure a quick movement of the tone arm for throwing the switch mechanism after the record is played, the record may be provided with a spiral groove in addition to the usual grooves, as shown in Fig. 8. As the needle reaches the end of the record its passes into this spiral groove and the arm is quickly thrown toward the center. This feature is preferable, though not absolutely essential to the successful operation of the machine. It provides a quick action for the switch but such action can also be secured by using a quick action snap switch operated by the gradual or slower movement of the tone arm toward the center.

The switching mechanism is also arranged so that a number of records may be played successively without starting the machine for each record. This is accomplished by means of the continuous playing lever 92 pivotally connected at 93 to one end of an arm 94 pivoted to a bearing 95 carried by the frame of the machine. The opposite end of the arm 94 is connected by means of a rod 96 to the tripping arm 79. Consequently any movement of the continuous playing lever 92 is communicated to the tripping arm 79. The arm 92 has a notch 97 arranged to fit over a pin 98 carried by a second tripping arm 99 biased to the position shown in Fig. 9 by a spring 100. When it is desired to play a number of records successively the arm 92 is moved into the position shown in Fig. 10 with the notch 97 registering with the pin 98. This is accomplished by means of a bell crank lever 101 having a pin 102 upon which the arm 92 rests. This bell crank lever is normally biased by a spring 103 to the position shown in Fig. 9, but may be moved to the position shown in Fig. 10 where it is held by the spring 103. The bell crank lever 101 is moved directly by hand or through the medium of a suitable lever or actuating rod, not shown.

When the playing of a record is finished with the continuous playing arm in the position shown in Fig. 10, the arm 79 is moved through the medium of arm 87, bell crank lever 90 and rod 91 in the manner hereinbefore described to open the circuit of the playing motor 36 and close the circuit of the main motor 5. The record carrier thereupon moves to return the record to the rack. As the carrier moves it engages the end of arm 79, thereby moving to the right, and thereby moving arm 72 off of the contact 70 and opening the circuit of the main motor. But this occurs only for an instant because the pin on the record carrier also engages the arm 98 and moves it to the right, such movement being communicated through the continuous playing lever 92 to the arm 94, which thereupon returns the arm 79 to the proper position to cause the arm 72 to engage the contact 70. The pin on the record carrier snaps over the arm 98 which is returned to the proper position by the spring 100 for maintaining the switch arm 72 in engagement with the contact 70 without causing the switch arm 81 to engage the contact 82. Consequently the motor 5 continues to run and as soon as it has deposited the record on the rack it transfers another record to the playing table and the mechanism operates automatically, as before. This continuous playing will be maintained as long as the continuous playing arm 92 engages the pin 98 on the arm 99. The length of time of this engagement may be controlled by the will of the operator in a simple machine.

The record rack and the means for automatically operating it are as follows:

The movable portion of the rack comprises a frame 110 shown in Figs. 3 and 5, which is provided with a plurality of arms 111 upon which the records rest. This carrier slides upon standards 112 attached to the base of the machine and is counterbalanced by weights 113 attached to the cords 114 which pass over pulleys 115 and are attached to the frame. The carrier is provided with toothed racks 116 with which mesh pinions 117 carried by a shaft 118. This shaft extends to one side of the machine and may be rotated by a knob 119 to manually adjust the position of the carrier, and the shaft also extends to the opposite side of the machine where a ratchet wheel 120 is attached thereto by means of which the rack may be automatically moved as the machine is operated. The rack is automatically operated by the following mechanism:

Carried by the main driving shaft of the machine is a cam disk 121 which has a cam groove 122 therein with which coöperates a cam roller 123 carried by one arm of a bell crank lever 124. The other arm of this bell crank lever is connected by means of a pin and slot connection to a link 125, which in turn is connected to one arm of a second bell crank lever 126, the other arm of which is connected by a reach rod 127 to a pivoted arm 128 carrying a pawl 129 arranged to engage with teeth on the periphery of the gear 120. The link 125 is normally biased by a spring 130 to cause the cam roller to engage one surface of the cam groove. As the main shaft rotates the bell crank lever 124 is oscillated and its movement transferred through the bell crank lever 126 to reach rod 127 and the arm 128 carrying the pawl 129, which, when moved in one direction engages the teeth of the gear 120 and moves the record rack. When moved in the other direction, the pawl rides over the teeth to a position for again engaging the teeth to move the gear and the record rack a second time. The mechanism is shown in Fig. 1 in a position to feed the record rack upwardly, the connections being such that for each movement of the reach rod 127 to the left the gear 120 is rotated sufficiently to move the rack upwardly the proper distance to place the next record in the position of the one which has just been played.

It will be observed that the records are supported by arms projecting from a movable carrier and they may be moved into a position where the arms 29 of the record carrier will grasp them when the carrier is moved and slide them out of the rack over to the playing mechanism.

Figure 12:
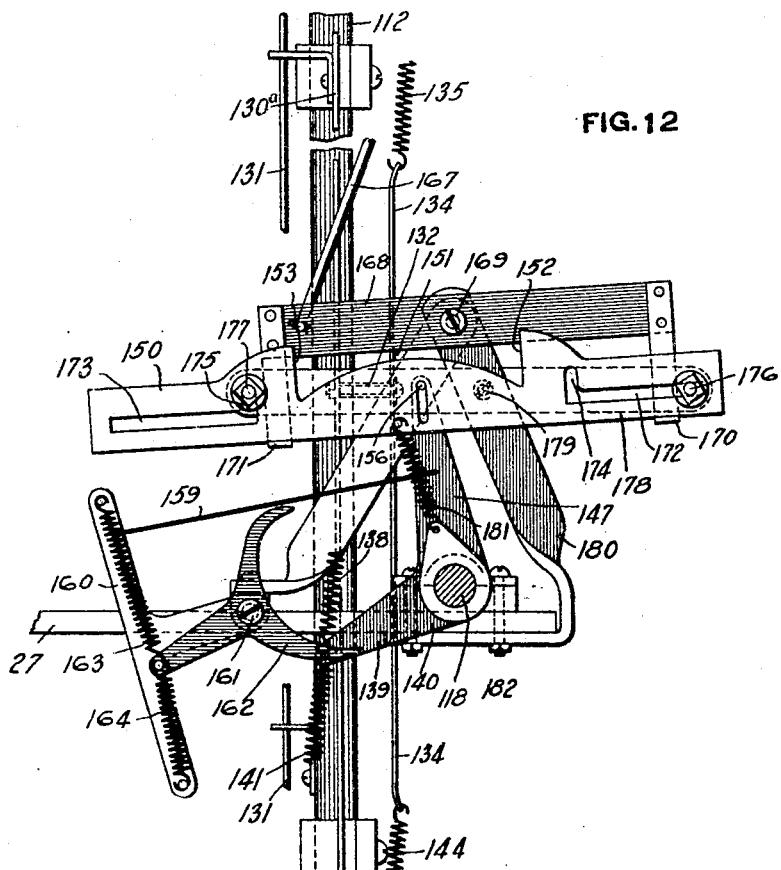
Fig. 12 is a side elevation of the mechanism for raising and lowering the record rack.
Figure 13:
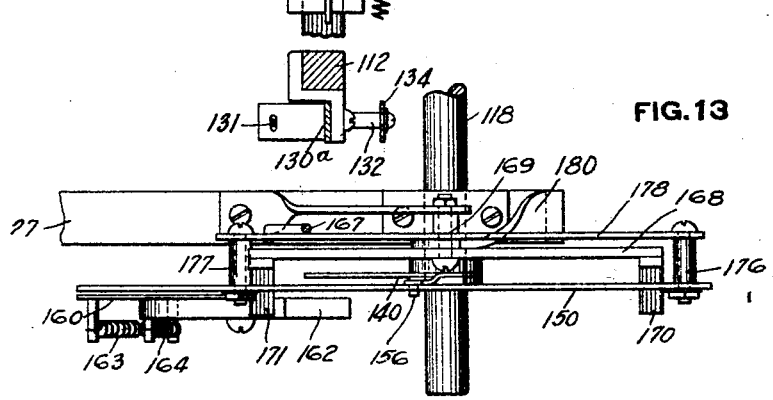
Fig. 13 is a plan view of the mechanism shown in Fig. 12.

When the record rack has reached either its upper or its lower position, the automatic feeding mechanism is automatically reversed so as to actuate the record rack in the opposite direction. The mechanism for accomplishing this result is shown in detail in Figs. 12 and 13 and is as follows:

The record rack 110 carries a bracket 130ᵃ which slides on a rod 131 and carries a pin 132 which operates in a groove 133 in a bar 134. This bar is connected at its top through a spring 135 to a cord 136, passing over a pulley 137 at the top of the frame and connected to another spring 138 which is connected to one arm 139 of a bell crank lever 140 shown in Fig. 12. Connected to the same arm of a bell crank lever is a second spring 141 attached to a cord 142 passing over a pulley 143 at the bottom of the machine and connected to a spring 144 attached to the lower end of the bar 134. Consequently whenever the rack 110 reaches the upper limit of its movement the pin 132 strikes the end of the slot in the bar 134 and the arm 139 of the bell crank lever is moved downwardly. As the rack reaches its bottom position the pin strikes the bottom of the slot 133 in bar 134 and moves the arm 139 of the bell crank lever upwardly.

The other arm 147 of the bell crank lever 1**

140 is connected by a pin and slot connection to a slidable member 150 having a cut-away portion 151 forming two shoulders 152 and 153. These shoulders are positioned so that when the bar 150 is moved they engage a pin 156 on the dog 129 and move it to its opposite position, the dog being held in either of its positions by a spring 157 attached to the arm 128 so that it gives a toggle action.

The arm 147 of the bell crank lever 140 also actuates, by means of a rod 159, a T-bar 160 pivoted at the point 161, at which point is also pivoted a safety dog 162 which engages the teeth of the gear 120 and prevents it being moved in the wrong direction by the dog 129. This dog has an arm which is attached by means of springs 163 and 164 to the outer ends of the arms of the T-bar. When the T-bar is moved as the bell crank lever 140 moves from one of its positions to the other, the dog 162 is moved from one position to the other.

From the above description it will be clear that when the bar 150 is moved from one position to the other, one of the shoulders 152 or 153 engages the pin on the dog 129 and moves the dog to a position so that it will operate the gear 120 in the opposite direction and at the same time the position of the dog 162 is reversed so that it will coöperate properly with the dog 129.

The bar 150 for reversing the automatic record rack actuating means is locked against movement except when the record rack reaches either its top or its bottom position. As the rack reaches its top position, the bracket 130 shown in Fig. 1, engages a stop 145 on the rod 131 and moves the rod upwardly. This rod is connected to the end of a pivoted lever 166 to the other end of which is fastened a rod 167 connected to the end of a bar 168. This bar is pivoted at the point 169 and at each end has depending portions 170 and 171 which engage the under side of the bar 150.

The bar 150 has slots 172 and 173 in its ends with right angle portions 174 and 175 respectively. Sliding within these slots are pins 176 and 177 carried by a bar 178 pivoted at 179 to the bracket 180. The bar 150 is normally biased downwardly by a spring 181 connected to a member 182 loosely journaled on the shaft 118. Consequently, when the bar 150 is at either of its extremes of movement, one of the pins 176 or 177 is in the right angle portion of its slot and the bar 150 cannot be moved longitudinally.

When the bracket 130 strikes the stop 145 on the rod 131 and moves the rod upwardly, the bar 168 is swung about its pivot to lift one end of the bar 150. In the position shown in Fig. 1, the right hand end of the bar 150 would be lifted and the pin 176 moved out of the right angular portion of the slot so that the bar 150 can be moved by the bell crank lever 140 to its opposite position, where it will be automatically pulled down by the spring 181, causing the pin 177 to pass into the right angle portion 175 of the slot and hold the bar 150 against longitudinal movement in the opposite directions. As the carrier reaches its bottom position it strikes a stop 146 on the rod 131 and raises the left hand end of the bar 150 to permit it to be moved in the opposite direction, such movement also reversing the positions of the dogs 129 and 162.

Accordingly whenever the record carrier reaches either of its extremes of movement the reversing mechanism is automatically unlocked and automatically thrown to the reversing position to permit the carrier to be operated in the reverse direction. The locking means prevents the carrier being reversed in any of its intermediate positions, as will be readily understood.

The record carrier has an indicator 185 fastened thereto, which has a pointer 186 traveling over the face of a board 187 which has numbers thereon corresponding to the numbers of the records. The contents of the record may be posted on a display panel 188 opposite the number of the record so that the selection corresponding to the number may be easily determined. Any other suitable designating characters may be used, if desired. In selecting a piece the operator merely rotates the knob 119 which moves the record rack until the pointer 186 comes opposite the number of the record which it is desired to play, whereupon he operates the handle 76 to start the machine.

Figure 15:
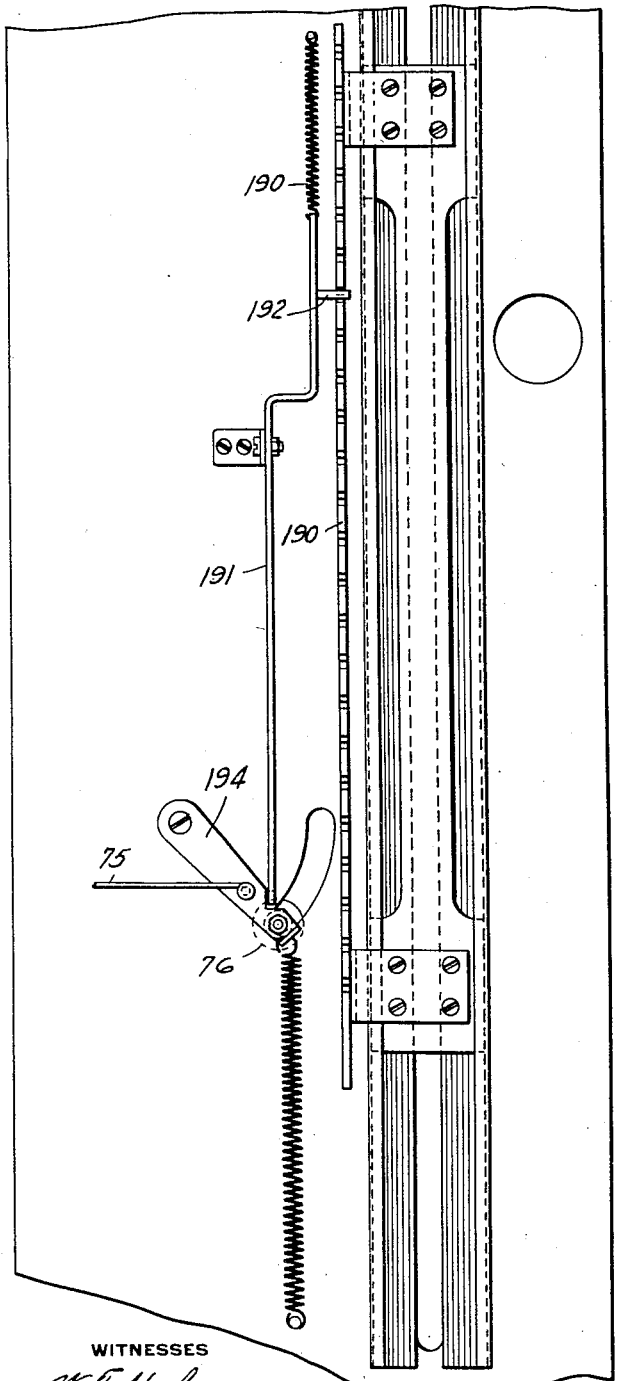
Fig. 15 is a side elevation of the mechanism shown in Fig. 14.
Figure 14:
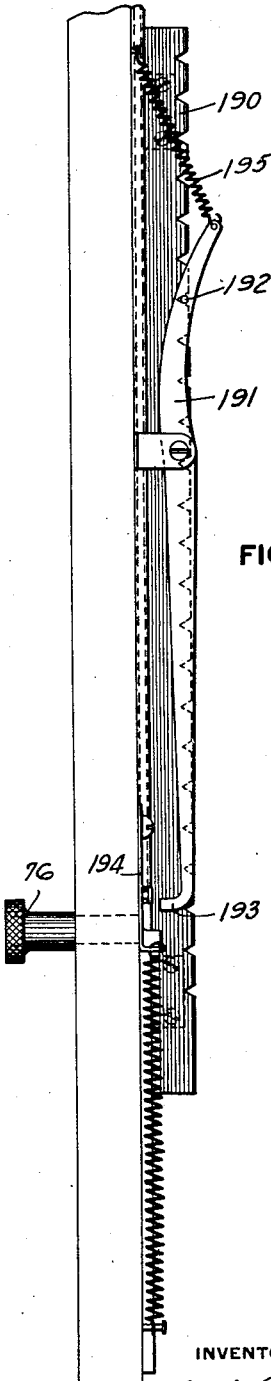
Fig. 14 is a rear elevation showing the mechanism for selecting the record to be played.

In order to prevent the machine being started when the rack has been moved to an intermediate position so that a record is not in its correct position to be grasped by the record carrier, the following mechanism, shown in Figs. 14 and 15, is provided:—

Attached to the frame is a bar 190 having a plurality of notches in its edge corresponding to the number of records in the record rack. Pivoted to the frame is a lever 191 having a pin 192 arranged to engage the notches in the edge of the bar 190. The lower end of this lever has a projection 193 which, when the pin 192 is riding on the space between the notches, projects toward the board and into the path of the lever 194 to which the handle 76 for starting the machine is attached. Consequently whenever the pin of lever 191 is not in register with one of the notches, the lower end of the lever prevents the operating handle from being moved. Whenever the pin registers with the notch, however, the lower end of the lever is moved out of the path of the operating lever by the spring 195 which normally biases the lever 191 to cause the pin to engage the notches. By means of this construction operation of the machine is prevented whenever the record rack is not in proper position, but such operation is permitted whenever the rack is in proper position.

The operation of the machine as a whole is, briefly, as follows:—

The operator moves the knob 119 until the indicator 186 comes opposite the number of the record which it is desired to play. If the pointer has been placed in proper position the operating lever 76 is unlocked and such lever is then moved upwardly, which operation closes the switch to the main motor 5. The main motor then rotates the main driving shaft which in turn actuates the record carrier and transfers the record from the record rack to the playing table. As the record reaches the rotating table of the playing mechanism it is automatically centered thereon by the member 38. Also, as the record reaches the table, the carrier strikes the lever 79 and actuates the switching mechanism to open the circuit of the main motor and close the circuit of the motor 36 which actuates the rotating table. This stops the record carrier and starts the playing mechanism for playing the record.

As the playing needle reaches the end of the record it enters the spiral groove cut in the record and quickly passes to a central position. In doing so it strikes the arm 87 and automatically operates the switching mechanism to open the circuit of the playing motor and close the circuit of the main motor. The playing mechanism is thus stopped and the record carrier actuated to return the record from the playing mechanism to the record rack. Just prior to the initial return movement of the record carrier the needle arm is automatically raised from the record and the tone arm is returned to position for playing the next record. As the record carrier reaches the position where it deposits the record in the rack, it again strikes the switching mechanism and automatically opens the circuit of the main motor which stops the entire mechanism.

If it is desired to play several records successively, the continuous playing lever 92 is moved to continuous playing position, so that when the record carrier returns the first record to the rack it does not open the circuit of the main motor except for an instant and the main motor continues to operate, whereupon the record carrier takes the next record from the rack and places it on the playing table. Such operation continues until the continuous playing arm is removed from continuous playing position.

In moving a record from the record rack and returning the same to the rack the main shaft 9 makes a complete revolution. The cam 121 carried thereby for actuating the ratchet mechanism which moves the record rack is timed so that as the record is returned to the rack the rack is automatically moved either up or down a sufficient distance to bring the next record between the arms 29 of the record carrier.

When the record rack reaches the end of its movement in either direction, the automatic actuating means is automatically reversed so that it is in condition to be operated in the opposite direction. Such reversal is prevented in any intermediate position by the locking mechanism hereinbefore described.

The above described apparatus may be operated by hand, as described.

It is to be understood that the structure shown is for purposes of illustration only and that many changes may be made in the details without departing from the spirit and scope of the invention as defined in the appended claims.

What is claimed is:—

1. An automatic sound reproducing machine comprising, in combination, a record magazine, automatically operated playing mechanism, an automatic transfer mechanism for transferring records individually from the magazine to the playing mechanism and after they are played return the same to the magazine, a motor for operating the playing mechanism, a motor for actuating the transfer mechanism, means automatically actuated by the transfer mechanism when a record is in position on the playing mechanism to stop the transfer motor and start the playing motor, means actuated automatically on completion of the playing of the record to stop the playing motor and start the transfer motor, and shiftable means arranged in one position to cause the transfer mechanism on its backward movement to continue the operation of the transfer motor to repeat the operation.

2. An automatic sound reproducing machine comprising, in combination, a record magazine, playing mechanism, a transfer mechanism for transferring records individually from the magazine to the playing mechanism and back again, an electric motor for operating the playing mechanism, an electric motor for actuating the transfer mechanism, switching mechanism arranged to be actuated by hand to start the transfer motor, means automatically actuated by the transfer mechanism when a record is in position on the playing mechanism to actuate said switching mechanism to stop the transfer motor and start the playing motor, means actuated automatically on completion of the playing of the record to actuate said switching mechanism in the opposite direction to stop the playing motor and start the transfer motor, and shiftable means arranged in one position to cause the transfer mechanism on its backward movement to actuate the switch mechanism to close the circuit to the transfer motor to repeat the operation.

3. An automatic sound reproducing machine comprising, in combination, a record magazine, playing mechanism, a transfer mechanism for transferring records individually from the magazine to the playing mechanism and back again, an electric motor for actuating the transfer mechanism, an electric motor for operating the playing mechanism, a switch actuated by hand to start the transfer motor and by the transfer mechanism when a record is in position on the playing mechanism to stop said transfer motor, a second switch controlling the playing motor, and connections between said switches whereby when the transfer motor is stopped the playing motor is started.

4. An automatic sound reproducing machine comprising, in combination, a record magazine, playing mechanism, a transfer mechanism for transferring records individually from the magazine to the playing mechanism and back again, an electric motor for actuating the transfer mechanism, an electric motor for operating the playing mechanism, a switch actuated by hand to start the transfer motor and by the transfer mechanism when a record is in position on the playing mechanism to stop said transfer motor, a second switch controlling the playing motor, connections between said switches whereby when the transfer motor is stopped the playing motor is started, and means actuated automatically on completion of the playing of a record to actuate said two switches to stop the playing motor and again start the transfer motor.

5. An automatic sound reproducing machine comprising, in combination, a record magazine, playing mechanism, a transfer mechanism for transferring records individually from the magazine to the playing mechanism and back again, an electric motor for actuating the transfer mechanism, an electric motor for operating the playing mechanism, a switch actuated by hand to start the transfer motor and by the transfer mechanism when a record is in position on the playing mechanism to stop said transfer motor, a second switch controlling the playing motor, connections between said switches whereby when the transfer motor is stopped the playing motor is started, means actuated automatically on completion of the playing of the record to actuate said two switches to stop the playing motor and again start the transfer motor, and means arranged on the backward movement of the transfer mechanism to further actuate said switches to stop the transfer motor without starting the playing motor.

6. An automatic sound reproducing machine comprising, in combination, a record magazine, playing mechanism, a transfer mechanism for transferring records individually from the magazine to the playing mechanism and back again, an electric motor for actuating the transfer mechanism, an electric motor for operating the playing mechanism, a switch actuated by hand to start the transfer motor and by the transfer mechanism when a record is in position on the playing mechanism to stop said transfer motor, a second switch controlling the playing motor, connections between said switches whereby when the transfer motor is stopped the playing motor is started, means actuated automatically on completion of the playing of the record to actuate said two switches to stop the playing motor and again start the transfer motor, and a shiftable means arranged in one position to be actuated on the return movement of the transfer mechanism to close the circuit to the transfer motor whereby to repeat the operation.

7. In an automatic sound reproducing machine, in combination, a record magazine, a playing mechanism, mechanism for automatically transferring a record from the magazine to the playing mechanism and returning it to the magazine, means for automatically moving the magazine step by step in either direction as the records are successively returned to it, and means for automatically reversing the direction of movement of the magazine when it reaches the end of its movement in either direction.

8. In an automatic sound reproducing machine, in combination, a record magazine for supporting a plurality of records in vertical series, a playing mechanism, means for automatically transferring in horizontal position a record from the magazine to the playing mechanism and returning it to the magazine, means for automatically moving the magazine vertically step by step in either direction after the records have been successively returned to it, and means for automatically reversing the direction of movement of the magazine when it reaches the end of its movement in either direction.

9. An automatic sound-reproducing machine having a record magazine, an automatically operated playing mechanism including a rotatable playing table, a movable tone arm and stylus, a transfer means for transferring a record from the magazine to the playing table and returning it to the magazine, means for centering the record on the table, an operating mechanism including an intermittent gear for actuating the transfer means in one direction and another intermittent gear for operating the transfer means in the opposite direction, camming mean for automatically actuating the record, centering means, camming means for automatically operating the stylus raising and tone arm returning means, and mechanism arranged to be operated by the transfer means as a record is transferred from the magazine to the playing table to automatically stop the operating mechanism and start the playing mechanism and also arranged so that as the playing of the record is completed the playing mechanism is stopped and the operating mechanism started to thereby raise the stylus, return the tone arm to the normal position, raise the centering means and actuate the transfer mechanism to return the record to the rack.

10. An automatic sound-reproducing machine having a record magazine, a rotatable playing table, an electric motor for rotating said table, mechanism for transferring a record from the magazine to the table and returning it to the magazine, an electric motor for operating said transfer mechanism, switching mechanism arranged so that when a record from the magazine is deposited on the playing table the circuit of the motor operating the transfer mechanism is opened and the circuit of the motor operating the playing table is closed, said switching mechanism being also arranged so that when the playing of the record is completed said circuit of the motor operating the playing table is opened and the circuit of the motor operating the transfer mechanism is closed to thereby stop the playing table and return the record to the rack, said switching mechanism being further arranged so that as the record is returned to the rack the circuit of the motor operating the transfer mechanism is opened, and means adapted to be positioned so as to prevent the circuit of the transfer mechanism being permanently opened as the record is returned to the rack, whereby the machine continues to operate to play a number of records successively.

11. An automatic sound-reproducing machine having a record magazine, a rotatable playing table, an electric motor for operating said table, a transfer mechanism for transferring records from the magazine to the playing table and returning them to the magazine, means for centering the records on the playing table, means for raising the playing stylus and returning the tone arm to position, a main electric motor for operating said transfer mechanism, centering device, stylus raising and tone arm shifting mechanisms, and switching mechanism arranged to be operated to start the main motor to thereby transfer a record from the magazine to the playing table, automatically center it thereon and drop the stylus into playing position, said switching mechanism being arranged so that when the record is deposited on the playing table the circuit of the main motor is opened and the circuit of the motor operating the playing table is closed, and also arranged so that as the playing of the record is completed the switching mechanism is operated to stop the playing motor and start the main motor, to thereby raise the stylus and operate the transfer mechanism to return the record to the magazine.

12. An automatic sound-reproducing machine having a record magazine, a rotatable playing table, an electric motor for operating said table, a transfer mechanism for transferring records from the magazine to the playing table and returning them to the magazine, means for centering the records on the playing table, means for raising the playing stylus and returning the tone arm to position, a main electric motor for operating said transfer mechanism, centering device, stylus raising and tone arm shifting mechanism, and switching mechanism arranged to be operated to start the main motor to thereby actuate the transfer mechanism to transfer a record from the magazine to the playing table, automatically center the record and drop the stylus into position, said switching mechanism being arranged to be operated by the transfer mechanism so that as the record is deposited on the playing table the circuit of the main motor is opened and the circuit of the motor operating the playing table is closed, said switching mechanism being also arranged to be operated by the tone arm so that as the playing of the record is completed the switching mechanism is actuated to stop the playing motor and start the main motor, to thereby raise the stylus from the record, return the tone arm to normal position and operate the transfer mechanism to return the record to the machine.

13. An automatic sound-reproducing machine having a record magazine, a rotatable playing table, an electric motor for operating said table, a transfer mechanism for transferring records from the magazine to the playing table and returning them to the magazine, means for centering the records on the playing table, means for raising the playing stylus and returning the tone arm to position, a main electric motor for operating said transfer mechanism, centering means, stylus raising and tone arm shifting mechanism, and switching mechanism arranged to be operated to start the main motor to thereby actuate the transfer mechanism to transfer a record from the magazine to the playing table, automatically center the record and drop the stylus into position, said switching mechanism being arranged to be operated by the transfer mechanism so that as the record is deposited on the playing table the circuit of the main motor is opened and the circuit of the motor operating the playing table is closed, said switching mechanism being also arranged to be operated by the tone arm so that as the playing of the record is completed the switching mechanism is actuated to stop the playing motor and start the main motor, to thereby raise the stylus from the record, return the tone arm to normal position and operate the transfer mechanism to return the record to the machine, said switching mechanism being further arranged to be operated by the transfer mechanism in its return movement so that as a record is deposited in the rack the circuit of the main motor is opened to stop the machine.

14. An automatic sound-reproducing machine having a record magazine, a rotatable playing table, an electric motor for operating said table, a transfer mechanism for transferring records from the magazine to the playing table and returning them to the magazine, means for centering the records on the playing table, means for raising the playing stylus and returning the tone arm to position, a main electric motor for operating said transfer mechanism, centering means, stylus raising and tone arm shifting means, and switching mechanism arranged to be operated to start the main motor to thereby actuate the transfer mechanism to transfer a record from the magazine to the playing table, automatically center the record and drop the stylus into position, said switching mechanism being arranged to be operated by the transfer mechanism so that as the record is deposited on the playing table the circuit of the main motor is opened and the circuit of the motor operating the playing table is closed, said switching mechanism being also arranged to be operated by the tone arm so that as the playing of the record is completed the switching mechanism is actuated to stop the playing motor and start the main motor to thereby raise the stylus from the record, return the tone arm to normal position and operate the transfer mechanism to return the record to the machine, said switching mechanism being further arranged to be operated by the transfer mechanism in its return movement so that as a record is deposited in the rack the circuit of the main motor is opened to stop the machine, and means adapted to be positioned to prevent the main motor being stopped as the record is returned to the rack, whereby the machine continues to operate to play a number of records successively.

15. An automatic sound-reproducing machine having a record magazine, a rotatable playing table, an electric motor for operating said table, a transfer mechanism for transferring records from the magazine to the playing table and returning them to the magazine, means for centering the records on the playing table, means for raising the playing stylus and returning the tone arm to position, a main electric motor for operating said transfer mechanism, centering device, stylus raising and tone arm shifting mechanism, and switching mechanism arranged to be operated to start the main motor to thereby actuate the transfer mechanism to transfer a record from the magazine to the playing table, automatically center the record and drop the stylus into position, said switching mechanism being arranged to be operated by the transfer mechanism so that as the record is deposited on the playing table the circuit of the main motor is opened and the circuit of the motor operating the playing table is closed, said switching mechanism being also arranged to be operated by the tone arm so that as the playing of the record is completed the switching mechanism is actuated to stop the playing motor and start the main motor, to thereby raise the stylus from the record, return the tone arm to normal position and operate the transfer mechanism to return the record to the machine, said switching mechanism being further arranged to be operated by the transfer mechanism in its return movement so that as a record is deposited in the rack the circuit of the main motor is opened to stop the machine, means operated by the main motor for moving the record magazine after a record has been returned thereto, to position another record in operative relation to the transfer mechanism, and means for preventing the main motor from being stopped after a record has been returned to the magazine whereby the machine continues to operate to play a number of records successively.

16. The combination with an automatic sound-reproducing machine having a record magazine, a motor operated playing mechanism and a motor operated transfer means for transferring records from the magazine to the playing mechanism and returning them to the magazine, of a switching mechanism controlling the circuits to both of said motors, said mechanism having a member arranged to be engaged by the transfer mechanism as a record from the magazine is deposited on the playing mechanism to actuate the switching mechanism to open the circuit of the transfer motor and close the circuit of the playing motor and as the transfer mechanism returns the record to the magazine to engage the member and actuate the switching mechanism to open the circuit of the transfer motor and keep the circuit of the playing motor open, said switching mechanism also having a member arranged to be engaged by the playing mechanism as the playing of the record is completed so as to actuate the switching mechanism to open the circuit of the playing motor and close the circuit of the transfer motor.

17. The combination with an automatic sound-reproducing machine having a record magazine, a motor operated playing mechanism and a motor operated transfer means for transferring records from the magazine to the playing mechanism and returning them to the magazine, of a switching mechanism controlling the circuits to both of said motors, said mechanism having a member arranged to be engaged by the transfer mechanism as a record from the magazine is deposited on the playing mechanism to actuate the switching mechanism to open the circuit of the transfer motor and close the circuit of the playing motor and as the transfer mechanism returns the record to the magazine to engage the member and actuate the switching mechanism to open the circuit of the transfer motor and keep the circuit of the playing motor open, said switching mechanism also having a member arranged to be engaged by the playing mechanism as the playing of the record is completed so as to actuate the switching mechanism to open the circuit of the playing motor and close the circuit of the transfer motor, and means arranged to automatically cause the circuit of the transfer motor to be reclosed when it is opened by the return movement of the transfer mechanism in returning the record to the magazine.

18. An automatic sound reproducing machine comprising, in combination, a record magazine, a playing mechanism, means for operating said playing mechanism, an automatically lifted and lowered record centering means associated with the playing mechanism, reciprocating means for transferring a record from the magazine to the playing mechanism and returning it to the magazine, a power shaft, a second shaft connected to said reciprocating transfer means, and gearing directly connected to said shafts and arranged, without reversal of the power shaft, to rotate said second shaft alternately in opposite directions.

19. An automatic sound reproducing machine comprising, in combination, a record magazine, a playing mechanism, means for operating said playing mechanism, an automatically lifted and lowered record centering means associated with the playing mechanism, reciprocating means for transferring a record from the magazine to the playing mechanism and returning it to the magazine, a power shaft, a transfer mechanism operating shaft directly connected to the power shaft to be rotated alternately in opposite directions, and means actuated by the reciprocating transfer mechanism for starting and stopping the power shaft.

20. An automatic sound reproducing machine comprising, in combination, a record magazine, a playing mechanism, means for operating said playing mechanism, means reciprocating back and forth in the same plane for transferring a record from the magazine to the playing mechanism and returning it to the magazine, a power shaft, connecting therefrom to the transfer mechanism arranged to reciprocate the latter alternately in opposite directions, means actuated by the transfer mechanism arranged to stop the power shaft when the record is in position on the playing mechanism and start the playing mechanism, a movable sound reproducing device, and means actuated thereby when the playing of the record is finished arranged to stop the playing mechanism and start the power shaft.

21. An automatic sound reproducing machine comprising, in combination, a record magazine, a playing mechanism, mechanism reciprocating back and forth in the same plane for transferring a record from the magazine to the playing mechanism and returning it to the magazine, means for operating said playing mechanism, a sound reproducing device associated with said playing mechanism, a power shaft, connections therefrom to the transfer mechanism arranged to reciprocate the same alternately in opposite directions, a cam on said power shaft, connections therefrom to the sound reproducing device arranged to lift the latter from the record when the record is finished, means controlled by the transfer mechanism arranged to stop the driving shaft when a record is brought into position on the playing mechanism and to then automatically start the playing mechanism, and automatic means actuated when the playing of a record is completed arranged to stop the playing mechanism and start the driving shaft to thereby raise the sound reproducing device from the record and actuate the transfer mechanism in its reverse direction.

22. An automatic sound reproducing machine comprising, in combination, a record magazine, a playing mechanism, mechanism reciprocating back and forth in the same plane for transferring a record from the magazine to the playing mechanism and returning it to the magazine, mechanism for shifting the record magazine, means for operating said playing mechanism, a sound reproducing device associated with said playing mechanism, a power shaft, connections therefrom to the transfer mechanism arranged to reciprocate the same alternately in opposite directions, a cam on said power shaft, connections therefrom to shift the record magazine after the return of the record thereto, means controlled by the transfer mechanism arranged to stop the driving shaft when a record is brought into position on the playing mechanism and to then automatically start the playing mechanism, and automatic means actuated when the playing of a record is completed arranged to stop the playing mechanism and start the driving shaft to thereby actuate the transfer mechanism in its reverse direction and when the record has reached the record magazine to shift said magazine.

23. An automatic sound reproducing machine comprising, in combination, a record magazine, a playing mechanism, mechanism reciprocating back and forth in the same plane for transferring a record from the magazine to the playing mechanism and returning it to the magazine, mechanism for shifting the record magazine, means for operating said playing mechanism, a sound reproducing device associated with said playing mechanism, a power shaft, connections therefrom to the transfer mechanism arranged to reciprocate the same alternately in opposite directions, a cam on said power shaft, connections therefrom to the sound reproducing device arranged to lift the latter from the record when the record is finished, a second cam on said power shaft, connections therefrom to shift the record magazine after the return of the record thereto, means controlled by the transfer mechanism arranged to stop the driving shaft when a record is brought into position on the playing mechanism and to then automatically start the playing mechanism, and automatic means actuated when the playing of a record is completed arranged to stop the playing mechanism and start the driving shaft to thereby raise the sound reproducing device from the record, actuate the transfer mechanism in its reverse direction, and when the record has reached the record magazine to shift said magazine.

24. An automatic sound reproducing machine comprising, in combination, a record magazine, a playing mechanism, mechanism reciprocating back and forth in the same plane for transferring a record from the magazine to the playing mechanism and returning it to the magazine, mechanism for shifting the record magazine, means for operating said playing mechanism, a sound reproducing device associated with said playing mechanism, a power shaft, connections therefrom to the transfer mechanism arranged to reciprocate the same alternately in opposite directions, a cam on said power shaft, connections therefrom to the sound reproducing device arranged to lift the latter from the record when the record is finished, a second cam on said power shaft, connections therefrom for centering a playing record on the playing mechanism, a third cam on said power shaft, connections therefrom to shift the record magazine after the return of the record thereto, means controlled by the transfer mechanism arranged to stop the driving shaft when a record is brought into position on the playing mechanism and to then automatically start the playing mechanism, and automatic means actuated when the playing of a record is completed arranged to stop the playing mechanism and start the driving shaft to thereby raise the sound reproducing device from the record, actuate the transfer mechanism in its reverse direction, and when the record has reached the record magazine to shift the said magazine.

25. An automatic sound reproducing machine comprising, in combination, a power shaft, a record magazine, a playing mechanism, means for operating said playing mechanism, a transfer device reciprocating back and forth in the same plane for transferring a record from the magazine to the playing mechanism and returning it to the magazine, a sound reproducing device associated with said playing mechanism, means for lifting said sound reproducing device from the record, means to return said sound reproducing device to position to start playing a new record, means actuated when a record reaches a position on the playing mechanism for stopping the power shaft and starting the playing mechanism, means actuated when the playing of a record is completed for stopping the playing mechanism and starting the power shaft, and connections from said power shaft arranged to reciprocate the transfer mechanism alternately in opposite directions, to lift the sound reproducer when the playing of the record is completed, and to return the sound reproducing device to position to start playing a new record.

26. An automatic sound reproducing machine, comprising, in combination, a power shaft, a record magazine, a playing mechanism, means for operating said playing mechanism, a transfer device reciprocating back and forth in the same plane for transferring a record from the magazine to the playing mechanism and returning it to the magazine, a sound reproducing device associated with said playing mechanism, means for lifting said sound reproducing device from the record, a device for centering a record on said playing mechanism, means to return the sound reproducing device to position to start playing a new record, means actuated when a record reaches a position on the playing mechanism for stopping the power shaft and starting the playing mechanism, means actuated when the playing of a record is completed for stopping the playing mechanism and starting the power shaft, and connections from said power shaft arranged to reciprocate the transfer mechanism alternately in opposite directions, to center the record when in position over the playing mechanism, to lift the sound reproducer when the playing of the record is completed, and to return the sound reproducing device to position to start playing a new record.

27. An automatic sound reproducing machine comprising, in combination, a power shaft, a record magazine, a playing mechanism, means for operating said playing mechanism, a transfer device reciprocating back and forth in the same plane for transferring a record from the magazine to the playing mechanism and returning it to the magazine, a sound reproducing device associated with said playing mechanism, means for lifting said sound reproducing device from the record, a device for centering a record on said playing mechanism, means to return said sound reproducing device to position to start playing a new record, means actuated when a record reaches a position on the playing mechanism for stopping the power shaft and starting the playing mechanism, means actuated by the sound reproducing device when the playing of a record is completed for stopping the playing mechanism and starting the power shaft, and connections from said power shaft arranged to reciprocate the transfer mechanism alternately in opposite directions, to center the record when in position over the playing mechanism, to lift the sound reproducer when the playing of the record is completed, and to return the sound reproducing device to position to start playing a new record.

28. An automatic sound reproducing machine comprising, in combination, a power shaft, a record magazine, a playing mechanism, means for operating said playing mechanism, a transfer device reciprocating back and forth in the same plane for transferring a record from the magazine to the playing mechanism and returning it to the magazine, a sound reproducing device associated with said playing mechanism, means for lifting said sound reproducing device from the record, means to return said sound reproducing device to position to start playing a new record, a device for centering a record on said playing mechanism, means to shift the record magazine, means actuated when a record reaches a position on the playing mechanism for stopping the power shaft and starting the playing mechanism, means actuated when the playing of a record is completed for stopping the playing mechanism and starting the power shaft, and connections from said power shaft arranged to reciprocate the transfer mechanism alternately in opposite directions, to center the record when in position over the playing mechanism, to lift the sound reproducer when the playing of the record is completed, to shift the record magazine when the record has been returned thereto, and to return the sound reproducing device to position to start playing a new record.

29. In a sound reproducing machine, the combination of a supporting frame, a record magazine, a record support adjacent to the magazine, a rotatable driving shaft, a rotatable member, means operated by the driving shaft to automatically turn said member at certain predetermined intervals during the rotation of the driving shaft, and means operated by said member to first move the magazine in one direction to different positions to bring the records therein successively into registry with the record support and to thereafter move the magazine in the reverse direction to different positions to bring the records therein successively into registry with the record support.

30. In a sound reproducing machine, the combination of a supporting frame, a record magazine, a record support adjacent to the magazine, and means operative to move said magazine to bring records therein successively into registry with the record support, said means including a reciprocative part and a pawl and ratchet mechanism operated by said part during the reciprocations thereof to periodically and automatically move the magazine to bring the records therein successively into registry with the record support and to periodically move the magazine in reverse direction to bring the records therein successively into registry with the record support in alternate succession.

In testimony whereof, I have hereunto set my hand.

RALEIGH W. GODFREY.

Witnesses:
W. F. SCHUHLER,
PAUL M. LOEWE.